(12) United States Patent
Sun et al.

(10) Patent No.: US 11,398,052 B2
(45) Date of Patent: Jul. 26, 2022

(54) CAMERA POSITIONING METHOD, DEVICE AND MEDIUM

(71) Applicants: Beijing BOE Optoelectronics Technology Co., Ltd., Beijing (CN); BOE Technology Group Co., Ltd., Beijing (CN)

(72) Inventors: Jiankang Sun, Beijing (CN); Hao Zhang, Beijing (CN); Lili Chen, Beijing (CN); Yachong Xue, Beijing (CN); Hongzhen Xue, Beijing (CN); Fuqiang Ma, Beijing (CN); Zehua Dong, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 314 days.

(21) Appl. No.: 16/838,744

(22) Filed: Apr. 2, 2020

(65) Prior Publication Data
US 2021/0090298 A1 Mar. 25, 2021

(30) Foreign Application Priority Data
Sep. 25, 2019 (CN) .......................... 201910912890.6

(51) Int. Cl.
G06K 9/00 (2022.01)
G06T 7/80 (2017.01)
G06T 7/73 (2017.01)
G02B 27/00 (2006.01)
G02B 27/01 (2006.01)

(52) U.S. Cl.
CPC ............ G06T 7/85 (2017.01); G02B 27/0093 (2013.01); G02B 27/0179 (2013.01); G06T 7/74 (2017.01); G02B 2027/0187 (2013.01)

(58) Field of Classification Search
CPC ... G06T 7/85; G06T 7/74; G06T 2207/30244; G06T 7/73; G02B 27/0093; G02B 27/0179; G02B 2027/0187; G02B 27/0172; G02B 27/017; G06F 3/013; G06V 40/19
See application file for complete search history.

(56) References Cited

U.S. PATENT DOCUMENTS

| | | | | |
|---|---|---|---|---|
| 4,852,988 A * | 8/1989 | Velez | ...................... | A61B 3/113 351/158 |
| 6,594,600 B1 * | 7/2003 | Arnoul | ...................... | G06T 7/85 702/94 |
| 10,248,859 B2 * | 4/2019 | Lee | ...................... | H04N 5/23218 |
| 10,255,481 B2 * | 4/2019 | Cho | ...................... | G06F 3/012 |

(Continued)

Primary Examiner — Shervin K Nakhjavan
(74) Attorney, Agent, or Firm — Banner & Witcoff, Ltd.

(57) ABSTRACT

A camera positioning method, device and medium are provided. The method includes: determining positioning configuration information; determining, according to the positioning configuration information, positioning information of the camera by a preset algorithm, the positioning information including distance limitation data which defines a distance between a target and the camera; and determining a position of the camera according to the positioning information, wherein the positioning configuration information includes target data, ratio data of a target image in an image captured by the camera, and camera parameter data.

13 Claims, 7 Drawing Sheets

(56) References Cited

U.S. PATENT DOCUMENTS

| | | | |
|---|---|---|---|
| 10,284,794 B1* | 5/2019 | Francois | H04N 5/3415 |
| 2004/0238732 A1* | 12/2004 | State | G02B 27/017 |
| | | | 250/281 |
| 2008/0252850 A1* | 10/2008 | Plagwitz | G06V 40/19 |
| | | | 351/210 |
| 2010/0080416 A1* | 4/2010 | Lee | G06V 40/165 |
| | | | 382/103 |
| 2015/0177906 A1* | 6/2015 | Yairi | G06F 3/013 |
| | | | 345/648 |
| 2016/0048968 A1* | 2/2016 | Egri | G01C 3/085 |
| | | | 382/106 |
| 2017/0323458 A1* | 11/2017 | Lablans | H04N 7/18 |
| 2019/0121427 A1* | 4/2019 | Qin | G06F 3/013 |
| 2019/0130538 A1* | 5/2019 | Zeng | G06T 5/003 |
| 2021/0090298 A1* | 3/2021 | Sun | G06T 7/74 |
| 2022/0012910 A1* | 1/2022 | Forsberg | G01S 5/16 |

\* cited by examiner

101 obtaining a field of view of the camera, and using the field of view as the camera parameter data — S1011 determining the length of the human eye and the ratio of the length to the height of the human eye, and using both of the length of the human eye and the ratio of the length to the height of the human eye as human eye data — S1012 determining the ratio data of the human eye image in the image captured by the camera — S1013

FIG.2

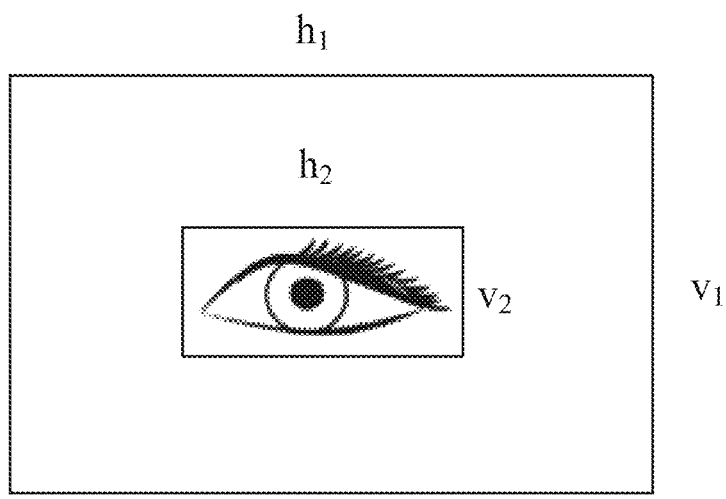

FIG.3

103 using the position of the human eye as an endpoint A, and determining another endpoint on a positioning line 31 of the eyewear apparatus as the position of the camera O, where the distance between the position of the camera and the position of the human eye satisfies the distance limitation data — S1031 connecting the position of the camera O and the position of the human eye A to form a connecting line 32, and the angle θ formed by the positioning line 31 and using the connecting line 32 as the shooting angle of the camera — S1032

FIG.8

CAMERA POSITIONING METHOD, DEVICE AND MEDIUM

CROSS-REFERENCE TO RELATED APPLICATION

The application claims priority to Chinese patent application No. 201910912890.6 filed on Sep. 25, 2019. For all purposes under the U.S. law, the entire disclosure of the aforementioned application is incorporated by reference as part of the disclosure of this application.

TECHNICAL FIELD

The present disclosure relates to a field of video display technology, and in particular, to a camera positioning method, device, and medium.

BACKGROUND

In the field of video display, especially in the field of video eyewear, for example in virtual reality (Virtual Reality, VR) eyewear, in order to lock in the target as the eyes rotate, the function of eye tracking is added. The acquisition of eye images is an important part of eyeball-tracking, and the quality of eye image acquisition directly affects the final tracking effect.

At present, in the field of video display, the positioning of camera is usually performed by a method of multiple simulation tests. This method is laborious and inefficient, which is not conducive to flexibly adjust the camera according to the position of the target. And when the camera is used to capture the movement of the eye, such as when used in VR eyewear or other eyewear apparatus, if the camera (such as an eyeball-tracking camera) is too far away from the human eye, the human eye accounts for a small proportion of the acquired image, which may lead to the difficulty in recognition and low recognition accuracy; if the camera is too close to the human eye and the human eye accounts for a large proportion of the acquired image, the human eye may exceed the shooting range of the camera when there is a small displacement between the human eye and the eyewear apparatus (such as VR eyewear), causing incomplete or invisible human eye shooting, which affects subsequent eyeball tracking.

Therefore, there is a need for a method that not only can accurately determines the position of the camera from the target and shooting angle of the camera, but also can easily and conveniently determine and adjust the position and shooting angle of the camera.

SUMMARY

In view of the above, according to the embodiments of the present disclosure, there is provided a camera positioning method, device and medium to solve the time-consuming, labor-intensive, and inefficient problems associated with existing positioning method of camera (especially the tracking cameras in video eyewear) dependent on simulation tests.

According to an aspect of the present disclosure, a camera positioning method is proposed, including: determining positioning configuration information; determining, according to the positioning configuration information, positioning information of the camera by a preset algorithm, wherein the positioning information includes distance limitation data which defines a distance between a target and the camera; determining a position of the camera according to the positioning information; wherein the positioning configuration information comprises target data, ratio data of a target image in an image captured by the camera, and camera parameter data.

In some embodiments, the target is a human eye, and determining the positioning configuration information includes: obtaining a field of view (FOV) of the camera and using the field of view of the camera as the camera parameter data; determining a length of the human eye and a ratio of the length to a height of the human eye, and using both of the length of the human eye and the ratio of the length to the height of the human eye as human eye data; determining the ratio data of a human eye image in the image captured by the camera.

In some embodiments, the positioning information further comprises shooting angle data of the camera; wherein determining the positioning information of the camera further comprises: determining the shooting angle data based on the distance limitation data; and the method further comprises: determining a shooting angle of the camera according to the shooting angle data.

In some embodiments, a value of the ratio data of the human eye image in the image captured by the camera is in the range of 1/3 to 2/3.

In some embodiments, the target is a human eye and the camera is a camera set in an eyewear apparatus, and said determining the position of the camera according to the positioning information comprises: using a position of the human eye as an endpoint, and determining another endpoint on a positioning line as the position of the camera, where the distance between the position of the camera and the position of the human eye satisfies the distance limitation data; and connecting the position of the camera with the position of the human eye to form a connecting line, and using an angle formed by the positioning line and the connecting line as the shooting angle of the camera, wherein the positioning line is a straight line passing through an edge of a lens in the eyewear apparatus and perpendicular to a plane on which a display screen of the eyewear apparatus is located.

In some embodiments, the method further includes: judging whether the shooting angle data is within a preset shooting angle range; in case that the shooting angle data is not within the preset shooting angle range, using the value in the preset shooting angle range closest to the shooting angle data as the shooting angle data of the camera, and adjusting the distance limitation data of the camera accordingly, wherein the adjusted distance limitation data is within a preset distance limitation range.

According to another aspect of the present disclosure, a camera positioning device is proposed, which includes a processor and a memory, where the memory comprises a set of instructions that, when executed by the processor, causes the camera positioning device to perform the following operations: determining positioning configuration information; determining, according to the positioning configuration information, positioning information of the camera by a preset algorithm, wherein the positioning information includes distance limitation data which defines a distance between a target and the camera; determining a position of the camera according to the positioning information, wherein the positioning configuration information comprises target data, ratio data of a target image in an image captured by the camera, and camera parameter data.

In some embodiments, the target is a human eye, and determining the positioning configuration information comprises: obtaining a field of view (FOV) of the camera and using the field of view as the camera parameter data; determining a length of the human eye and a ratio of the length to a height of the human eye, and using both of the length of the human eye and the ratio of the length to the height of the human eye as human eye data; and determining the ratio data of a human eye image in the image captured by the camera.

In some embodiments, the positioning information further comprises shooting angle data of the camera; wherein determining the positioning information of the camera further comprises: determining the shooting angle data based on the distance limitation data; and the camera positioning device is further configured to perform the following operations: determining a shooting angle of the camera according to the shooting angle data.

In some embodiments, a value of the ratio data of the human eye image in the image captured by the camera is in the range of 1/3 to 2/3.

In some embodiments, the target is a human eye and the camera is a camera set in an eyewear apparatus, and said determining the position of the camera according to the positioning information comprises: using a position of the human eye as an endpoint, and determining another endpoint on a positioning line as the position of the camera, where the distance between the position of the camera and the position of the human eye satisfies the distance limitation data; connecting the position of the camera with the position of the human eye to form a connecting line, and using an angle formed by the positioning line and the connecting line as the shooting angle of the camera, wherein the positioning line is a straight line passing through an edge of a lens in the eyewear apparatus and perpendicular to a plane on which a display screen of the eyewear apparatus is located.

In some embodiments, the camera positioning device is further configured to perform the following operations: judging whether the shooting angle data is within a preset shooting angle range; in case that the shooting angle data is not within the preset shooting angle range, using the value closest to the shooting angle data in the preset shooting angle range as the shooting angle data of the camera, and adjusting the distance limitation data of the camera accordingly, wherein the adjusted distance limitation data is within a preset distance limitation range.

According to another aspect of the present disclosure, a computer-readable storage medium is proposed, in which computer-readable instructions are stored, and when the instructions are executed by a computer, the above camera positioning method is implemented.

According to the technical solution provided by the embodiments of the present disclosure, the electronic manner of determining the camera positioning information according to the positioning configuration information can solve the tedious testing problem brought by the traditional simulation testing manner, and obtain the effects of improving efficiency and saving time and effort.

BRIEF DESCRIPTION OF THE DRAWINGS

Other features, objects, and advantages of the present disclosure will become more apparent by reading the detailed description of the non-limitative embodiments with reference to the following drawings:

FIG. 2 illustrates an exemplary flowchart of a process of determining positioning configuration information S101 according to an embodiment of the present disclosure;

FIG. 3 illustrates an exemplary schematic diagram of an image captured by a camera according to an embodiment of the present disclosure;

FIG. 8 illustrates an exemplary flowchart of determining a camera position S103 according to an embodiment of the present disclosure;

DETAILED DESCRIPTION

Figure 1:
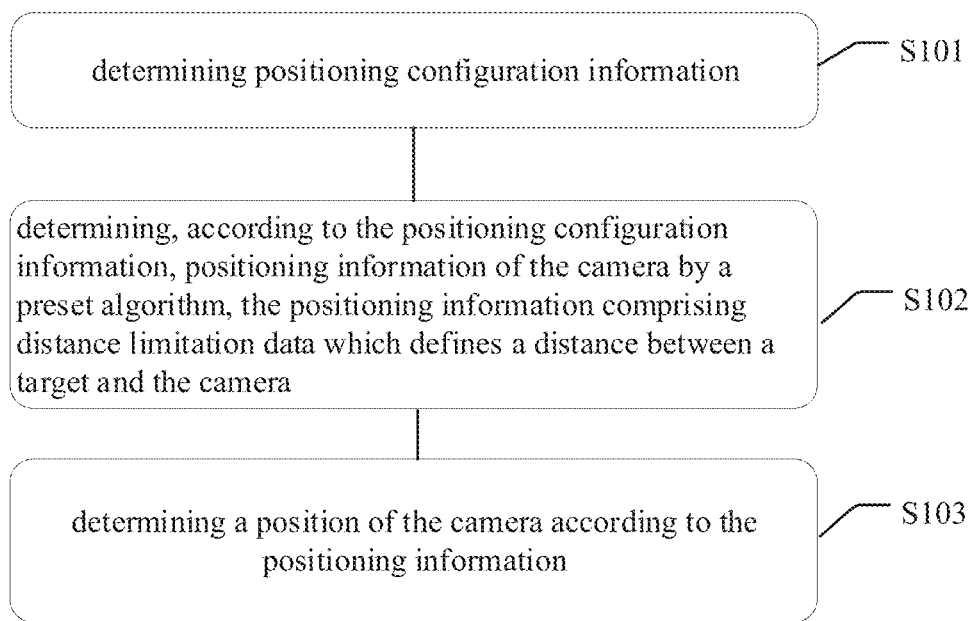
FIG. 1 illustrates an exemplary flowchart of a camera positioning method 100 according to an embodiment of the present disclosure.

The following describes the present disclosure in detail with reference to the accompanying drawings and embodiments. It can be understood that the specific embodiments described herein are only used to explain the related invention, rather than limiting the invention. It should also be noted that, for convenience of description, only the parts related to the invention are shown in the drawings.

It should be noted that, in the case of no conflict, the embodiments in the present disclosure and the features in the embodiments can be combined with each other. The application will be described in detail below with reference to the drawings and embodiments.

FIG. 1 illustrates an exemplary flowchart of a camera positioning method 100 according to an embodiment of the present disclosure. The camera is for example used to capture a target image. Specifically, referring to FIG. 1, the camera positioning method includes steps S101-S103.

At first, in step S101, positioning configuration information is determinized.

The positioning configuration information is intended to represent related configuration information for implementing camera positioning. The positioning configuration information includes target data, ratio data of a target image in an image captured by the camera, and camera parameter data.

For example, the target data includes length and width data of the target; and the camera parameter data is intended to characterize the configuration parameters of the camera, such as the field of view (FOV) data of the camera, or may include other camera parameter data.

Thereafter, in step S102, positioning information of the camera is determined according to the positioning configuration information through a preset algorithm, and the positioning information includes distance limitation data which defines a distance between the target and the camera.

The preset algorithm may be, for example, a preset formula or a formula group, or may be an algorithm based on a neural network, and the embodiments of the present disclosure are not limited by the composition of the preset algorithm and its specific content.

The positioning information includes, for example, only the distance limitation data, or it may also include other data such as the shooting angle data of the camera, and the embodiments of the present disclosure are not limited by the specific composition of the positioning information.

After obtaining the positioning information of the camera, in step S103, the position of the camera is determined according to the positioning information.

Based on the above, the positioning information of the camera is calculated through a preset algorithm based on the positioning configuration information, thereby the position of the camera can be easily and conveniently determined compared to the method of determining the position of the camera through multiple tests. Meanwhile, the determination of the position of the camera according to the embodiments of the present disclosure does not require multiple repeated experiments, which simplifies the steps of determining the position of the camera, and improves the accuracy of the determined position of the camera.

In some embodiments, the target is a human eye, the above-mentioned process of determining the positioning configuration information may be described more specifically. FIG. 2 illustrates an exemplary flowchart of a process of determining positioning configuration information S101 according to an embodiment of the present disclosure.

Referring to FIG. 2, first, in step S1011, a field of view (FOV) of the camera is obtained, and the field of view (FOV) is used as the camera parameter data.

The field of view of the camera is intended to characterize the range of view angle of the camera, and it can be represented, for example, by the angle formed by the line connecting the upper left corner point of the image captured by the camera and the center point of the camera, and the line connecting the lower right corner point of the image captured by the camera and the center point of the camera. Embodiments of the present disclosure are not limited by the specific data of the field of view of the camera.

After the camera parameter data is determined, in step S1012, the length of the human eye and the ratio of the length to the height of the human eye are determined, and both of the length of the human eye and the ratio of the length to the height of the human eye are used as human eye data.

Hereinafter, in step S1013, the ratio data of the human eye image in the image captured by the camera is determined. The ratio data of the human eye image in the image captured by the camera is intended to represent the ratio of the size of the human eye to the size of the camera imaging, it can be set according to actual needs, for example, the human eye image is set to occupy two thirds of the camera image, or the human eye image is set to occupy one half of the camera image. The embodiments of the present disclosure are not limited by specific numerical values of the ratio data.

It should be understood that, the above steps S1011, S1012 and S1013 may be performed at the same time, or they may also be performed in order, and the embodiments of the present disclosure are not limited by the execution order of the steps S1011-S1013.

Based on the above, when the target is the human eye, by acquiring human eye data, the field of view data of camera, the ratio data of the human eye image in the camera image, and using them as positioning configuration information, subsequent positioning of the camera based on the positioning configuration information can be facilitated.

In some embodiments, the process of determining the positioning information of the camera via a preset algorithm according to the positioning configuration information may be described in more detail, for example, when the preset algorithm is a preset formula or formula group, and the positioning configuration information is the field of view of the camera, the human eye data, and the ratio data of human eye image in the image captured by the camera, for example, the following formula 1) can be used to calculate the distance limitation data according to the positioning configuration information:

$$d = \frac{v_2 \cdot \sqrt{1+r_2^2}}{r_2 \cdot \tan\frac{Fov}{2}} \quad 1)$$

where, $v_2$ is the length of the human eye, $r_2$ is the ratio value of the length to the height of the human eye, $r_3$ is the ratio data of the human eye image in the image captured by the camera, and FOV is the field of view of the camera.

Figure 4:
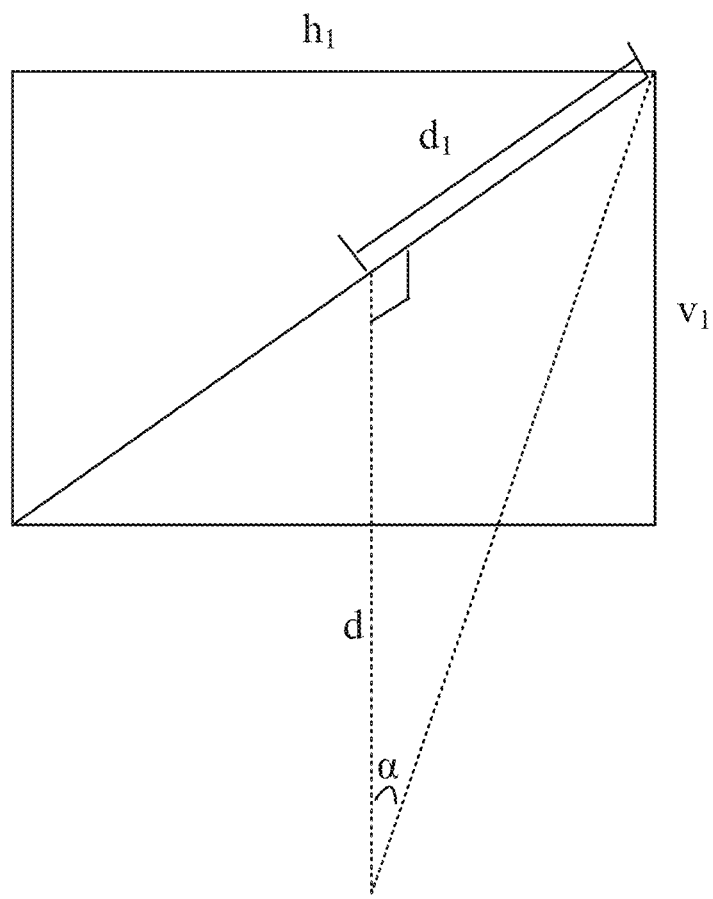
FIG. 4 is a schematic diagram showing that the image in FIG. 3 without a target human eye.
Figure 5:
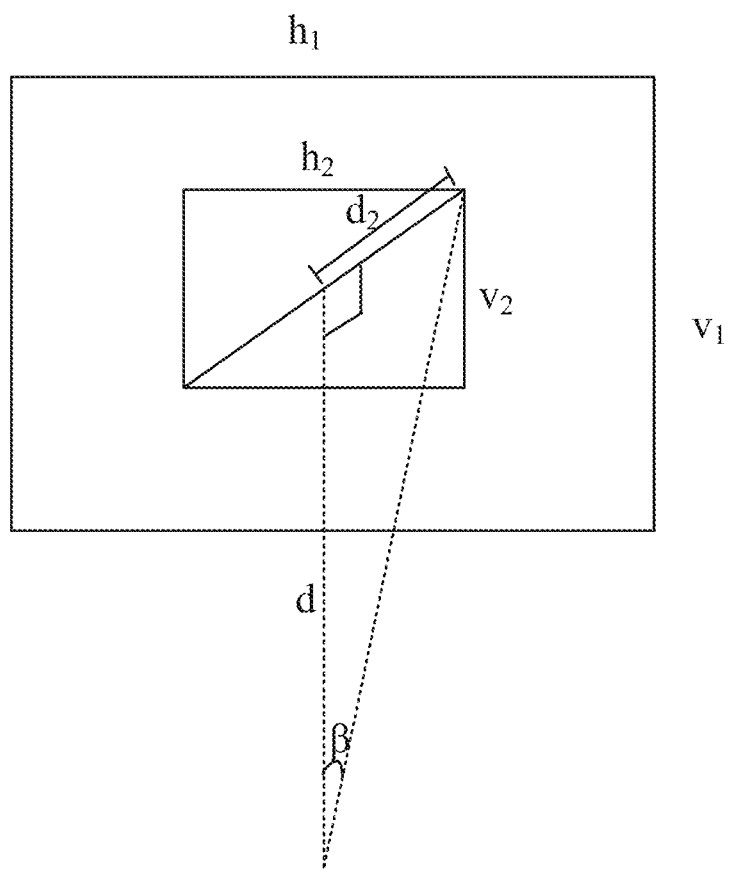
FIG. 5 illustrates an exemplary schematic diagram of determining positioning information based on the image in FIG. 3.

It will be further described below with reference to FIGS. 3 to 5. Among them, FIG. 3 illustrates an exemplary schematic diagram of an image captured by a camera according to an embodiment of the present disclosure, FIG. 4 is a schematic diagram showing the image in FIG. 3 without a target human eye, and FIG. 5 illustrates an exemplary schematic diagram of determining positioning information based on the image in FIG. 3.

For the convenience of description, the length of the image captured by the camera is $h_1$, the height of the image captured by the camera is $v_1$, the length of the human eye in the image is $h_2$ and the height of the human eye in the image is $v_2$. At this time, as shown in FIG. 4, there is a relationship between the distance d between the human eye and the camera and the field of view FOV of the camera:

$$\tan\alpha = \tan\frac{Fov}{2} = \frac{d_1}{d} \quad 2)$$

where $d_1$ is half of the diagonal length of the image captured by the camera, and the angle $\alpha$ is half of the field of view (FOV). As shown in FIG. 5, the relationship between the distance d between the human eye and the camera and the size data of the human eye is as follows:

$$\tan\beta = \frac{d_2}{d} \quad 3)$$

where, $d_2$ is half of the diagonal line of the human eye frame in the image, and the human eye frame is, for example, the smallest rectangular frame that can include a complete human eye image. The following relations are deduced by formulas 2) and 3):

$$\frac{\tan\alpha}{\tan\beta} = \frac{\tan\frac{Fov}{2}}{\frac{d_2}{d}} = \frac{\frac{d_1}{d}}{\frac{d_2}{d}} = \frac{d_1}{d_2} = \frac{h_1}{h_2} \quad 4)$$

Then using formulas 2) to 4), the following formula is derived:

$$d = \frac{h_1 \cdot d_2}{h_2 \cdot \tan\frac{Fov}{2}} = \frac{d_2}{\gamma_2 \cdot \tan\frac{Fov}{2}} = \quad 5)$$

$$\frac{d_2}{\gamma_2 \cdot \tan\frac{Fov}{2}} - \frac{\frac{\sqrt{h_2^2+v_2^2}}{2}}{\gamma_2 \cdot \tan\frac{Fov}{2}} - \frac{\frac{\sqrt{(v_2 \cdot r_2)^2+v_2^2}}{2}}{\gamma_2 \cdot \tan\frac{Fov}{2}} = \frac{v_2 \cdot \sqrt{1+r_2^2}}{\gamma_2 \cdot \tan\frac{Fov}{2}}$$

where $h_2$ is the length of the human eye, $r_2$ is the ratio value of the length $h_2$ of the human eye to the height $v_2$ of the human eye, and $r_3$ is the ratio data of the target image in the image captured by the camera, which can be expressed by $h_2/h_1$.

Based on the above, after determining the human eye data and the camera parameter data, and determining the ratio data of the human eye image in the camera captured image to obtain the positioning configuration information, the distance limitation data is calculated based on the positioning configuration information, so that the positioning information of the camera can be obtained simply and conveniently, and at the same time, it is helpful to adjust the ratio data of the human eye image in real time according to the actual needs, so as to adjust the camera positioning information.

In addition, when setting the ratio data of the human eye image in the image captured by the camera, the human eye image is often too large or too small due to the inappropriate ratio setting.

Specifically, in case that the ratio of the human eye image in the captured image is less than 1/3, it will cause difficulty in recognition of the eye and reduce the recognition accuracy; in case that the ratio of the human eye in the image is greater than 2/3, when the human eye moves in a small range, there may be cases where the human eye exceeds the shooting range of the camera.

Based on this, in some embodiments, the value of the ratio data of the human eye image in the image captured by the camera is in the range of 1/3 to 2/3. Specifically, for example, the ratio data of the human eye image in the image captured by the camera is set to be 1/2.

Based on the above, by setting the ratio of the human eye image in the image captured by the camera to be in the range of 1/3 to 2/3, it is possible to make the human eye have a better ratio in the camera, thereby achieving good imaging of the target human eye and improve the imaging effect of the images captured by the camera.

In some embodiments, the positioning information further includes shooting angle data of the camera. At this time, determining the positioning information of the camera further includes: determining shooting angle data based on the distance limitation data. And the method further includes: determining a shooting angle of the camera according to the shooting angle data.

The shooting angle data of the camera is intended to characterize the angle formed by the lens surface of the camera and the horizontal plane. And the process of determining the shooting angle data of the camera according to the distance limitation data may be, for example, obtaining the shooting angle data of the camera by pluging the distance limitation data of the camera into a preset algorithm or equation set, or directly calculating the shooting angle data of the camera based on the distance limitation data of the camera and the position of the human eye. The embodiments of the present disclosure are not limited by the specific calculation method of the shooting angle data.

Based on the above, in this application, the shooting angle data of the camera is further calculated according to the distance limitation data of the camera, so that the shooting angle of the camera is associated with the camera position, thus enabling real-time adjustment of the corresponding shooting angle according to different camera positions, so as to better realize the shooting of human eye target.

Figure 6:
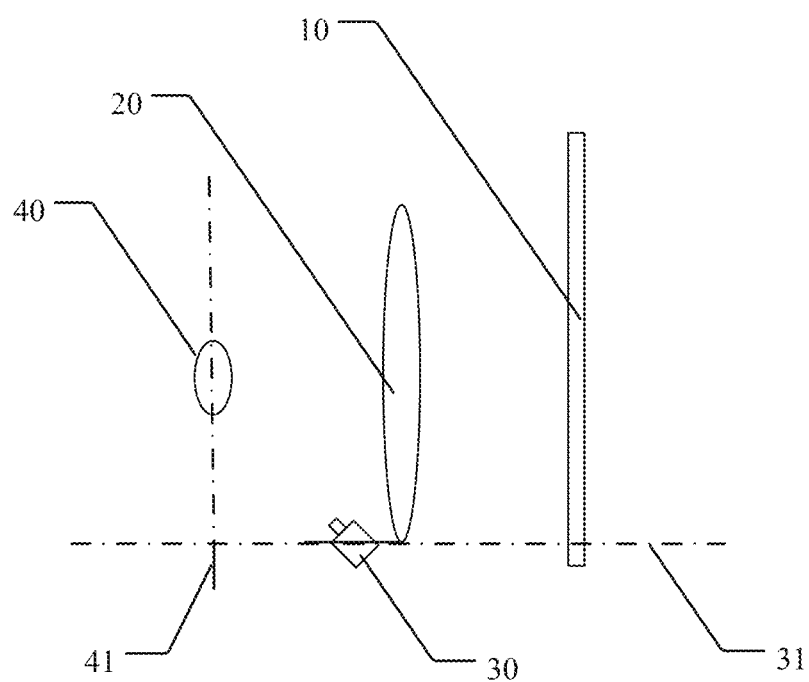
FIG. 6 is a schematic structural diagram of an eyewear apparatus according to an embodiment of the present disclosure.

In some embodiments, the target is the human eye and the camera is a camera set in an eyewear apparatus, and the process of determining the camera position and its shooting angle according to the positioning information can be more specifically described at this time. FIG. 6 is a schematic structural diagram of an eyewear apparatus according to an embodiment of the present disclosure, FIG. 7 illustrates a schematic diagram of determining the position of the camera in the eyewear apparatus shown in FIG. 6 according to an embodiment of the present disclosure, and FIG. 8 illustrates an exemplary flowchart of determining a camera position S103 according to an embodiment of the present disclosure.

First, referring to FIG. 6, the eyewear apparatus is, for example, video eyewear, such as VR eyewear. The eyewear apparatus includes a display screen 10, a lens 20, and a camera 30, and the display screen 10, the lens 20, and the camera 30 are sequentially arranged. The camera is a tracking camera for capturing eyeball images, and the eyewear apparatus will recognize the area of interest of the human eye or select a target based on the eyeball image.

In FIG. 6, the human eye 40 is located on a side of the lens 20 facing away from the display screen 10, and the camera 30 is located between the human eye 40 and the lens 20.

Figure 7:
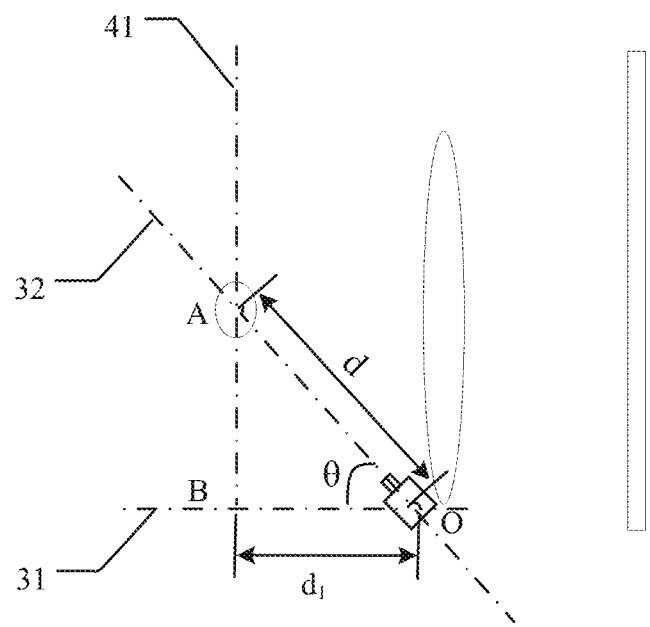
FIG. 7 illustrates a schematic diagram of determining the position of the camera in the eyewear apparatus shown in FIG. 6 according to an embodiment of the present disclosure.

Based on the structure of the above-mentioned video eyewear, further referring to FIGS. 7-8, when determining the position of the camera, first, in step S1031, the position of the human eye is used as an endpoint A, and another endpoint is determined on a positioning line 31 of the eyewear apparatus as the position of the camera O, where the distance between the position of the camera (the another endpoint) and the position of the human eye (the endpoint A) satisfies the distance limitation data.

The positioning line is a straight line passing through an edge of the lens in the eyewear apparatus and perpendicular to a plane on which a display screen of the eyewear apparatus is located.

Thereinafter, in step S1032, the position of the camera O and the position of the human eye A is connected to form a connecting line 32, and the angle θ formed by the positioning line 31 and the connecting line 32 is used as the shooting angle of the camera.

As shown in FIG. 6, specifically, the shooting angle data θ can be expressed as:

$$\theta = \arccos\frac{d_1}{d} \quad 6)$$

where $d_1$ is the distance between the camera and the plane 41 of the human eye or the distance between the camera and the projection point B of the human eye on the positioning line, and d is the distance between the camera and the human eye, that is, distance limitation data.

Based on the foregoing, in the eyewear apparatus, such as video eyewear, according to the above method, it is possible to determine the position of the camera in the eyewear apparatus and the shooting angle data of the camera based on the calculated distance limitation data of the camera, which is beneficial to the better positioning of the camera in the eyewear apparatus. Therefore, the video eyewear, such as VR eyewear, can capture human eyes, especially the eyeball position information of human eyes, and corresponding subsequent process can be performed according to the eyeball position information of the human eyes, for example, the area in which the human eye is interested is displayed at a higher resolution, and areas in which the human eye is not interested is displayed at a lower resolution, or a corresponding human-computer interaction response may be performed according to the position information of the human eye. According to the embodiments of the present disclosure, it can be avoided to determine the relatively good shooting position of the camera by analyzing the images actually taken when the camera is in different positions one by one, and the speed and accuracy of the determination of the position of the camera can be improved.

When the above method is used to determine the position of the camera and to determine the shooting angle data of the camera, if the shooting angle is too small or too large, the position of the captured human eye image will be far from the center of the image, or the human eye cannot be completely captured.

Based on this, in some embodiments, after determining the distance limitation data of the camera and further determining the shooting angle data based on the distance limitation data, the method further includes a process of verifying the shooting angle data, specifically, first, judging whether the shooting angle data is within a preset shooting angle range.

The preset shooting angle range is, for example, a shooting angle range set in advance by a user, or it may be a corresponding shooting angle range calculated based on the foregoing method according to the range of the distance limitation data preset by the user.

When the shooting angle data does not belong to the shooting angle range, the value closest in the preset shooting angle range to the shooting angle data is used as the shooting angle data of the camera, and the distance limitation data of the camera is adjusted accordingly. And the adjusted distance limitation data is within a preset distance limitation range.

Based on the above, in the present disclosure, in case that the determined shooting angle data is not within the preset shooting angle range, the value in the preset shooting angle range closest to the shooting angle data can be used as the shooting angle data of the camera, so that the human eye image captured by the camera exists in the center area of the camera image, which is conducive to the subsequent image processing and recognition process.

According to another aspect of the present disclosure, there is also provided a camera positioning device, the device including a processor and a memory, the memory containing a set of instructions that, when executed by the processor, causes the camera positioning device to perform the following operations: determining positioning configuration information; determining, according to the positioning configuration information, positioning information of the camera by a preset algorithm, wherein the positioning information includes distance limitation data which defines a distance between a target and the camera; determining a position of the camera according to the positioning information, wherein the positioning configuration information comprises target data, ratio data of a target image in an image captured by the camera, and camera parameter data.

Based on the above, the positioning information of the camera is calculated through a preset algorithm based on the positioning configuration information, thereby the determination of the position of the camera can be easily and conveniently determined compared to determining the position of the camera through multiple tests. Meanwhile, the determination of the position of the camera does not require multiple repeated experiments, which simplifies the steps of determining the position of the camera, and improves the accuracy of the determined position of the camera.

In some embodiments, wherein the target is a human eye, and said determining the positioning configuration information comprises: obtaining a field of view (FOV) of the camera and using the field of view as the camera parameter data; determining a length of the human eye and a ratio of the length to a height of the human eye, and using both of the length of the human eye and the ratio of the length to the height of the human eye as a human eye data; and determining the ratio data of a human eye image in the image captured by the camera.

Based on the above, when the target is the human eye, by acquiring human eye data, the field of view data of camera, the ratio data of the human eye image in the camera image, and using them as positioning configuration information, subsequent positioning of the camera based on the positioning configuration information can be facilitated.

In some embodiments, the positioning information further comprises shooting angle data of the camera; wherein determining the positioning information of the camera further comprises: determining the shooting angle data based on the distance limitation data; and the camera positioning device is further configured to perform the following operations: determining a shooting angle of the camera according to the shooting angle data.

Based on the above, in this application, the shooting angle data of the camera is further calculated according to the distance limitation data of the camera, so that the shooting angle of the camera is associated with the camera position, thus enabling real-time adjustment of the corresponding shooting angle according to different camera positions, so as to better realize the shooting of human eye target.

In some embodiments, a value of the ratio data of the human eye image in the image captured by the camera is in the range of 1/3 to 2/3.

By setting the ratio of the human eye image in the image captured by the camera to be in the range of 1/3 to 2/3, it is possible to make the human eye image have a better ratio in the camera image, thereby achieving good imaging of the target human eye and improve the imaging effect of the image captured by the camera.

In some embodiments, the target is the human eye and the camera is a camera set in an eyewear apparatus, and determining the position of the camera according to the positioning information comprises: using the position of the human eye as an endpoint and determining another endpoint on the positioning line as the position of the camera, where the distance between the position of the camera (said another endpoint on the positioning line) and the position of the human eye (said endpoint) satisfies the distance limitation data; connecting the position of the camera with the position of the human eye to form a connecting line, and using an angle formed by the positioning line and the connecting line as the shooting angle of the camera, wherein the positioning line is a straight line passing through an edge of a lens in the eyewear apparatus and perpendicular to a plane on which a display screen of the eyewear apparatus is located.

In the eyewear apparatus, such as video eyewear, based on the foregoing, it is possible to determine the position of the camera in the eyewear apparatus and the shooting angle data of the camera based on the calculated distance limitation data of the camera, which is beneficial to the better positioning of the camera in the eyewear apparatus. Therefore, the video eyewear, such as VR eyewear, can capture human eyes, especially the eyeball position information of human eyes, and corresponding subsequent process can be performed according to the eyeball position information of the human eyes. According to the embodiments of the present disclosure, it can be avoided to determine the relatively good shooting position of the camera by analyzing the images actually taken when the camera is in different positions one by one, and the speed and accuracy of the determination of the position of the camera can be improved.

In some embodiments, the camera positioning device is further configured to perform the following operations: judging whether the shooting angle data is within a preset shooting angle range; in case that the shooting angle data is not within the preset shooting angle range, using the value in the preset shooting angle range closest to the shooting angle data as the shooting angle data of the camera, and adjusting the distance limitation data of the camera accordingly, wherein the adjusted distance limitation data is within a preset distance limitation range.

Based on the above, in the present disclosure, in case that the determined shooting angle data is not within the preset shooting angle range, the value in the preset shooting angle range closest to the shooting angle data can be used as the shooting angle data of the camera, so that the human eye image captured by the camera exists in the center area of the camera image, which is conducive to the subsequent image processing and recognition process.

Figure 9:
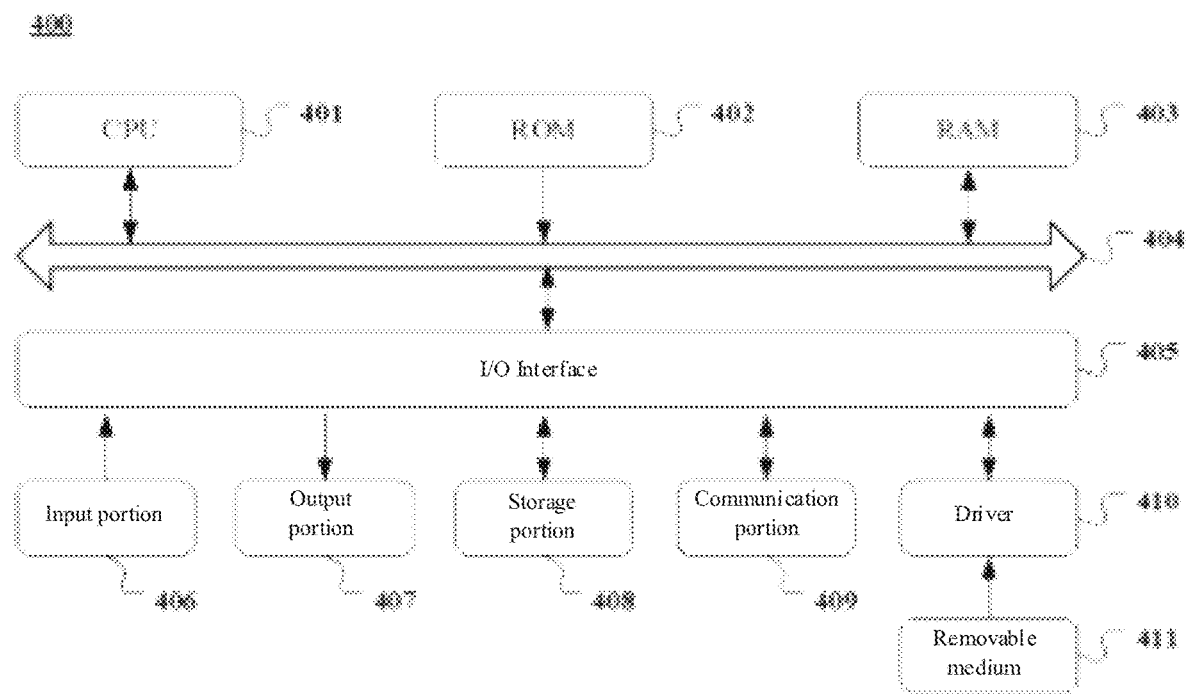
FIG. 9 is a schematic structural diagram of a camera positioning device according to an embodiment of the present disclosure.

Specifically, FIG. 9 illustrates a schematic structural diagram of a camera positioning device according to an embodiment of the present disclosure. The camera positioning method of the present disclosure may be implemented by using the following camera positioning device, and the camera positioning device has the above functions.

As shown in FIG. 9, as another aspect, the present disclosure further provides a camera positioning device 400 including one or more central processing unit (CPU) 401, which may perform various appropriate actions and processes according to a program stored in a read-only memory (ROM) 402 or a program loaded into a random access memory (RAM) 403 from the storage portion 408. In the RAM 403, various programs and data required for the operation of the system 400 are also stored. The CPU 401, the ROM 402, and the RAM 403 are connected to each other through a bus 404. An input/output (I/O) interface 405 is also connected to the bus 404.

The following components can be connected to the I/O interface 405: an input portion 406 including a keyboard, a mouse, and the like; an output portion 407 including a cathode ray tube (CRT), a liquid crystal display (LCD), and the speaker; a storage portion 408 including a hard disk and the like; and a communication portion 409 including a network interface card such as a LAN card, a modem, and the like. The communication portion 409 performs communication process via a network such as the Internet. The driver 410 is also connected to the I/O interface 405 as needed. A removable medium 411, such as a magnetic disk, an optical disk, a magneto-optical disk, a semiconductor memory, etc., can be installed on the drive 410 as needed, so that a computer program read therefrom can be installed into the storage portion 408 as needed.

According to another aspect of the present disclosure, a camera positioning apparatus is provided, which includes a positioning configuration information determination module, a positioning information configuration module, and a camera position determination module.

The positioning configuration information determination module is configured to determine positioning configuration information.

The positioning information configuration module is configured to determine, according to the positioning configuration information, positioning information of the camera by a preset algorithm, wherein the positioning information includes distance limitation data which defines a distance between a target and the camera.

The camera position determination module is configured to determine the position of the camera according to the positioning information.

The positioning configuration information comprises target data, ratio data of a target image in an image captured by the camera, and camera parameter data.

The camera positioning apparatus can perform the method described above and has the functions described above.

In particular, according to an embodiment of the present disclosure, the process described above with reference to FIG. 1 may be implemented as a computer software program. For example, embodiments of the present disclosure include a computer program product including a computer program tangibly embodied on a machine-readable medium, the computer program containing program codes for performing a camera positioning method. In such an embodiment, the computer program may be downloaded and installed from a network through the communication portion 409, and/or installed from a removable medium 411.

As yet another aspect, the present disclosure further provides a non-volatile computer-readable storage medium, which may be a computer-readable storage medium included in the device described in the foregoing embodiments; it may also be a computer-readable storage medium that exists separately and is not assembled into the device. The computer-readable storage medium stores one or more computer-readable instructions, and when the instructions are executed by a computer, the camera positioning method described in the present disclosure can be performed.

The flowchart and block diagrams in the figures illustrate the architecture, functionality, and operation of possible implementations of systems, methods and computer program products according to various embodiments of the present disclosure. In this regard, each block in the flowchart or block diagram may represent a module, a program segment, or a part of code, which contains one or more executable instructions to implement a specified logical function. It should also be noted that in some alternative implementations, the functions noted in the blocks may also occur in a different order than those marked in the drawings. For example, two blocks represented one after the other may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs the specified function or operation, or it can be implemented by a combination of dedicated hardware and computer instructions.

The units or modules described in the embodiments of the present disclosure may be implemented in a software manner, or may be implemented in a hardware manner. The described units or modules may also be provided in a processor. For example, each of the units may be a software program provided in a computer or a mobile smart device, or may be a separately configured hardware device. Among them, the names of these units or modules do not in any way constitute a limitation on the units or modules themselves.

The above description is only a preferred embodiment of the present disclosure and an explanation of the applied technical principles. Those skilled in the art should understand that the scope of the invention involved in this application is not limited to the technical solution of the specific combination of the above technical features, it should also cover other technical solutions formed by arbitrarily combining the above technical features or equivalent features without departing from the inventive concept. For example, a technical solution formed by replacing the above features with technical features disclosed in the present disclosure (but not limited to) with similar functions.

What is claimed is:

1. A camera positioning method, comprising:
   determining positioning configuration information;
   determining, according to the positioning configuration information, positioning information of the camera by a preset algorithm, the positioning information comprising distance limitation data which defines a distance between a target and the camera; and
   determining a position of the camera according to the positioning information;
   wherein the positioning configuration information comprises target data, ratio data of a target image in an image captured by the camera, and camera parameter data.

2. The camera positioning method according to claim 1, wherein the target is a human eye, and said determining the positioning configuration information comprises:
   obtaining a field of view of the camera and using the field of view as the camera parameter data;
   determining a length of the human eye and a ratio of the length to a height of the human eye, and using both of the length of the human eye and the ratio of the length to the height of the human eye as human eye data; and
   determining the ratio data of a human eye image in the image captured by the camera.

3. The camera positioning method according to claim 1, wherein the positioning information further comprises shooting angle data of the camera; wherein said determining the positioning information of the camera further comprises:
   determining the shooting angle data based on the distance limitation data; and
   the method further comprises: determining a shooting angle of the camera according to the shooting angle data.

4. The camera positioning method according to claim 3, further comprising:
   judging whether the shooting angle data is within a preset shooting angle range; and
   in case that the shooting angle data is not within the preset shooting angle range, using the value in the preset shooting angle range closest to the shooting angle data as the shooting angle data of the camera, and adjusting the distance limitation data of the camera accordingly, wherein the adjusted distance limitation data is within a preset distance limitation range.

5. The camera positioning method according to claim 1, wherein the target is a human eye, and a value of the ratio data of the human eye image in the image captured by the camera is in the range of 1/3 to 2/3.

6. The camera positioning method according to claim 1, wherein the target is the human eye and the camera is a camera set in an eyewear apparatus, and said determining the position of the camera according to the positioning information comprises:
   using a position of the human eye as an endpoint, and determining another endpoint on a positioning line as the position of the camera, where the distance between the position of the camera and the position of the human eye satisfies the distance limitation data; and
   connecting the position of the camera with the position of the human eye to form a connecting line, and using an angle formed by the positioning line and the connecting line as the shooting angle of the camera,
   wherein the positioning line is a straight line passing through an edge of a lens in the eyewear apparatus and perpendicular to a plane on which a display screen of the eyewear apparatus is located.

7. A camera positioning device comprises a processor and a memory, wherein the memory comprises a set of instructions that, when executed by the processor, causes the camera positioning device to perform the following operations:
   determining positioning configuration information;
   determining, according to the positioning configuration information, positioning information of the camera by a preset algorithm, the positioning information comprising distance limitation data which defines a distance between a target and the camera; and
   determining a position of the camera according to the positioning information,
   wherein the positioning configuration information comprises target data, ratio data of a target image in an image captured by the camera, and camera parameter data.

8. The camera positioning device according to claim 7, wherein the target is a human eye, and said determining the positioning configuration information comprises:
   obtaining a field of view of the camera and using the field of view as the camera parameter data;
   determining a length of the human eye and a ratio of the length to a height of the human eye, and using both of the length of the human eye and the ratio of the length to the height of the human eye as human eye data; and
   determining the ratio data of a human eye image in the image captured by the camera.

9. The camera positioning device according to claim 7, wherein the positioning information further comprises shooting angle data of the camera; wherein said determining the positioning information of the camera further comprises:
   determining the shooting angle data based on the distance limitation data; and
   the camera positioning device is further configured to perform the following operations: determining a shooting angle of the camera according to the shooting angle data.

10. The camera positioning device according to claim 9, wherein the camera positioning device is further configured to perform the following operations:
    judging whether the shooting angle data is within a preset shooting angle range; and
    in case that the shooting angle data is not within the preset shooting angle range, using the value in the preset shooting angle range closest to the shooting angle data as the shooting angle data of the camera, and adjusting the distance limitation data of the camera accordingly, wherein the adjusted distance limitation data is within a preset distance limitation range.

11. The camera positioning device according to claim 7, wherein the target is the human eye, and a value of the ratio data of the human eye image in the image captured by the camera is in the range of 1/3 to 2/3.

12. The camera positioning device according to claim 7, wherein the target is the human eye and the camera is a camera set in an eyewear apparatus, and determining the position of the camera according to the positioning information comprises:

using a position of the human eye as an endpoint, and determining another endpoint on a positioning line as the position of the camera, where the distance between the position of the camera and the position of the human eye satisfies the distance limitation data; and connecting the position of the camera with the position of the human eye to form a connecting line, and using an angle formed by the positioning line and the connecting line as the shooting angle of the camera, wherein the positioning line is a straight line passing through an edge of a lens in the eyewear apparatus and perpendicular to a plane on which a display screen of the eyewear apparatus is located.

13. A non-transitory computer-readable storage medium in which computer-readable instructions are stored, and when the instructions are executed by a computer, the following operations are executed:

determining positioning configuration information;

determining, according to the positioning configuration information, positioning information of the camera by a preset algorithm, the positioning information comprising distance limitation data which defines a distance between a target and the camera; and determining a position of the camera according to the positioning information, wherein the positioning configuration information comprises target data, ratio data of a target image in an image captured by the camera, and camera parameter data.

* * * * *